Aug. 6, 1968 W. FISHBEIN ET AL 3,396,392
CW RADAR SYSTEM
Filed April 5, 1962 3 Sheets-Sheet 1

INVENTORS,
WILLIAM FISHBEIN &
OTTO E. RITTENBACH.
BY Jack H. Linscott
ATTORNEY.

Aug. 6, 1968 W. FISHBEIN ETAL 3,396,392
CW RADAR SYSTEM
Filed April 5, 1962 3 Sheets-Sheet 2
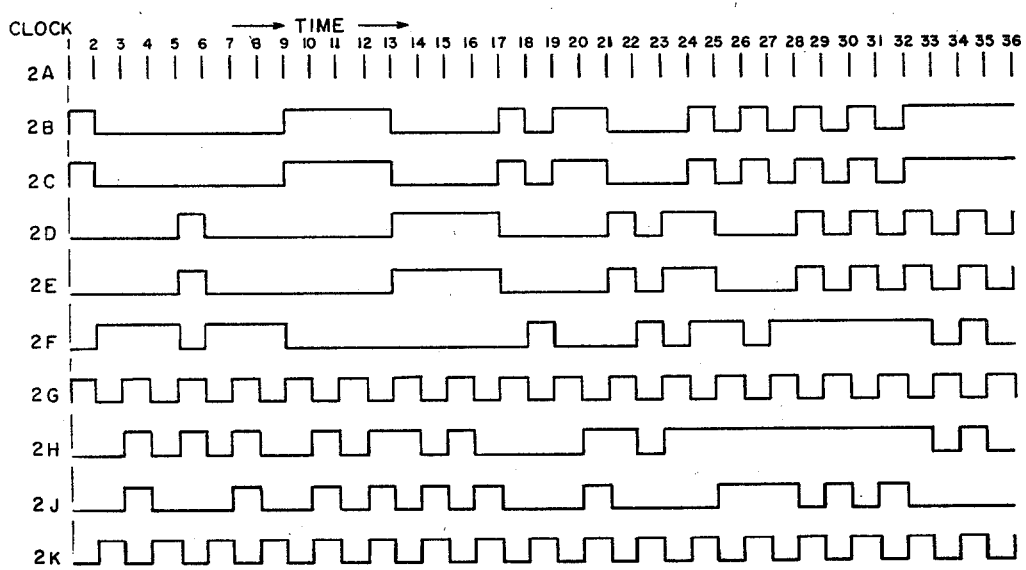
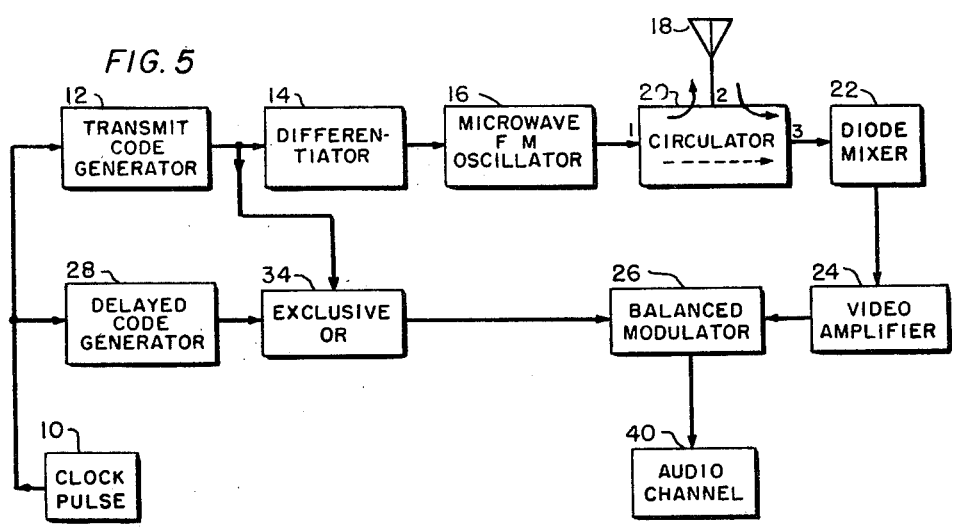
INVENTORS,
WILLIAM FISHBEIN &
OTTO E. RITTENBACH.
BY Jack H. Linscott
ATTORNEY.

INVENTORS,
WILLIAM FISHBEIN &
OTTO E. RITTENBACH.
ATTORNEY.

United States Patent Office 3,396,392
Patented Aug. 6, 1968

3,396,392
CW RADAR SYSTEM
William Fishbein, New Shrewsbury, and Otto E. Rittenbach, Neptune, N.J., assignors to the United States of America as represented by the Secretary of the Army
Filed Apr. 5, 1962, Ser. No. 185,790
10 Claims. (Cl. 343—14)

The invention described herein may be manufactured and used by or for the Government for governmental purposes without the payment of any royalty thereon.

This invention relates to CW radar systems and more particularly to a correlation radar using random or pseudo-random modulation.

Basically, radar transmission is either pulse modulated or continuous. The conventional pulse radar has two shortcomings. First, since the pulse width and pulse repetition frequency are constrained by resolution and maximum range requirements, the average transmitted power of a conventional pulse radar can be increased only by increasing the peak transmitter power. Second, the short pulse width requires that the target Doppler frequency be determined by pulse to pulse measurement. The limitation proposed by the sampling theorem then prevents unambiguous measurement of Doppler frequencies higher than one-half the pulse repetition frequency. While the above mentioned limitations of pulsed radar can be overcome by the use of CW radar, the CW radar also presents certain disadvantages. By utilizing the Doppler effect, CW radar may be used for detecting moving targets but it can neither measure range nor resolve targets in range without complicated modification. Secondly, due to the variation of target echo strength with the fourth power of range, close in targets can drown out marginal signals. Another disadvantage resides in the fact that the sensitivity of CW radar systems is generally poor.

It is an object of the present invention to provide a CW radar wherein the above mentioned limitations are overcome.

In accordance with one embodiment of the present invention, the CW radar system includes a source of microwave RF energey, a source of clock pulses at a prescribed frequency and means for deriving a random pulse code from the clock pulses. Included further are means responsive to the random pulse code signals for frequency modulating the output phase of the microwave RF energy such that the phase level output thereof at the initiation of each of the random code pulses is shifted 180° from the phase level of the RF output at the termination of each of the random code pulses. In addition, there is included a common antenna means for radiating the alternately phase shifted RF energy and to receive a wave reflected from a distant target, the received wave being delayed a prescribed time corresponding to the range of the distant target. Included further are means for mixing the reflected wave with a portion of the radiated wave to provide a beat video-form signal and means responsive to the clock pulse signals for producing a time-delayed replica of the RF modulating signal, the time delay corresponding to the range of the distant target. Including further are means for generating a signal at one-half the frequency of the clock pulses, a first comparison circuit, an amplifier and a second comparison circuit. The first comparison circuit is responsive to the beat video-form signal and a second input derived by combining the random code signal, the one-half clock frequency signal and the time-delayed replica signal in a manner to produce a code-like signal such that the output of the first comparison circuit comprises a signal having a strong component at one-half clock frequency. The strong component frequency is amplified and compared in the second comparison circuit with the one-half clock pulse frequency signal to produce an audio signal corresponding to the Doppler frequency of the target signal.

In another embodiment of the invention, there is included means responsive to the clock pulses for producing a pseudo-random code and also for producing the same pseudo-random code shifted by one bit. Included further are means responsive to the pseudo-random code signal and the one-bit shifted pseudo-random code signal for modulating the output frequency of the microwave RF source such that the phase shift in any one bit period will be shifted 180°. Also included are means for mixing the reflected wave with a portion of the radiated wave to produce a first beat video-form signal, means responsive to the clock pulses for producing a time-delayed replica of the pseudo-random code signal, with the time delay corresponding to the range of the distant target, and means for generating a signal at one-half the clock pulses. Included further are two comparison circuits and an amplifier tuned to the one-half clock frequency but delayed one-half bit. The first comparison circuit is responsive to the beat video-form signal and a second input derived by combining the pseudo-random code signal, the one-half clock frequency signal and the time-delayed replica pseudo-random signal to produce a code-like signal, and delaying the code-like signal one-half bit. The output of the first comparison circuit comprises a signal having a strong component at one-half the clock frequency which is applied to the amplifier. The second comparison circuit is responsive to the amplified signal and the one-half clock pulse frequency signal whereby there is produced an audio signal corresponding to the Doppler frequency of the target signal.

For a better understanding of the invention, together with other and further objects thereof, reference is made to the following description taken in connection with the accompanying drawings in which:

FIGS. 2 and 4 are explanatory curves;

FIG. 5 is a schematic diagram of a simplified version of the system shown in FIGS. 1 and 3.

Figure 1:
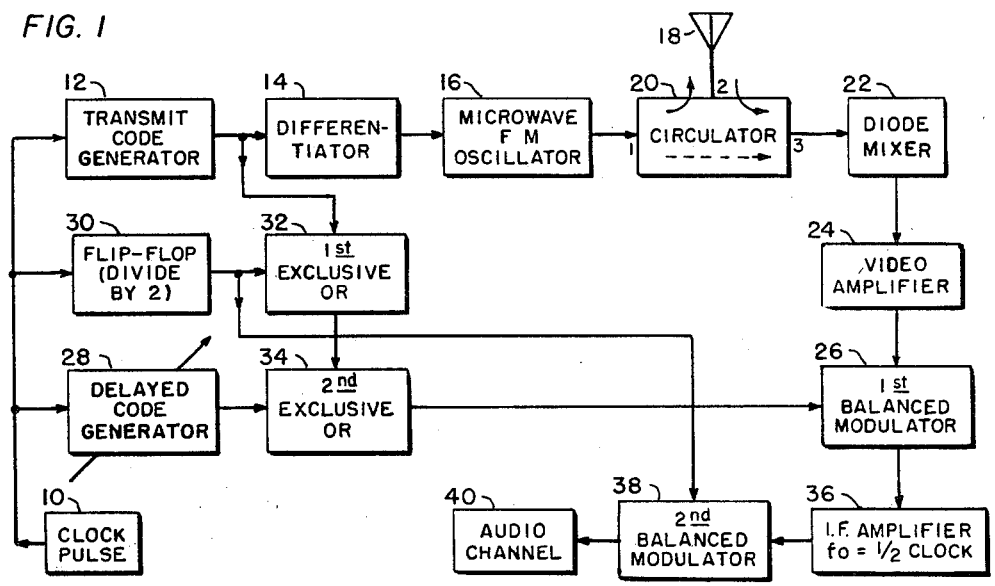
FIG. 1 is a schematic diagram of one embodiment of the present invention.

Referring now to FIG. 1 of the drawing, there is shown at 10 a clock pulse source adapted to provide a series of uniformly spaced clock pulses at a prescribed frequency. A transmit code generator 12 is responsive to the output of clock pulse source 10 to provide a pulse code consisting of substantially rectangular pulses occurring at random clock pulse times and of varying duration, which includes an integral number of clock pulses, but uniform in amplitude. The output of transmit code generator 12 is applied to differentiator 14, the output of which deviates the frequency of a microwave FM oscillator 16 which may comprise either a magnetron or klystron or any other FM oscillator well known in the art. The duration and amplitude of the impulse signal outputs from differentiator 14 are such that the frequency of microwave FM oscillator 16 is deviated sufficiently in magnitude and time duration to cause the output phase of the FM oscillator 16 signals to be 180° different from what would have been present if the output impulses from differentiator 14 were not applied thereto. This is due to the well known relationship between the time integral of frequency deviation and phase shift. This combination of the differentiator and FM oscillator may be said to provide substantially the same effect and be equivalent to the combination of a sine wave microwave oscillator and balanced modulator. The output of FM oscillator 16 is applied to an antenna 18 by means of a conventional three-port circulator 20 which is arranged such that RF energy entering port 1 from FM oscillator 16 is directed to antenna 18 through port 2 for transmission and also leaks through circulator 20 to port 3 thereof without delay. Any targets in the path of the transmitted RF energy are returned to the antenna 18 and are passed through to circulator port 3. By this arrangement, the leak-through signal is used as a local oscillator to combine with the delayed signals which are returning from external targets, the antenna 18 of course being utilized for both transmission and reception.

The RF leak-through signal and the incoming or received target signals are combined at port 3 of circulator 20 and applied to a diode mixer 22 which is adapted to produce a video-form beat signal output. It is to be understood, of course, that the leak-through signal is of relatively large amplitude compared to the returning echoes.

As shown, the video-form output from diode mixer 22 is applied through video amplifier 24 as one of two inputs to a first balanced modulator 26. The other input to first balanced modulator 26 is derived in the following manner. The output of clock pulse source 10 is applied to delayed code generator 28 which is adapted to produce a rectangular pulse code similar to that derived from transmit code generator 12, but delayed in time. The delay between the outputs of the two code generators corresponds to the delay time of a radar signal which goes from the transmitter to the target and returns to the radar antenna. Simultaneously, the frequency output of clock pulse source 10 is divided in half by means of a flip-flop 30, or other suitable one-half frequency divided circuit, the output of which is combined with the output of transmit code generator 12 in a first exclusive-OR circuit 32. The resultant output derived from first exclusive-OR circuit 32 is combined witeh the output of delayed code generator 28 in a second excluisve-OR circuit 34, and it is the output derived from second exclusive-OR circuit 34 which is applied as the second input to first balanced modulator 26. As shown, the output of first balanced modulator 26 is applied through IF amplifier 36, which is tuned to one-half the frequency of the clock pulses derived from source 10, as one of two inputs to a second balanced modulator 38. The other input to second balanced modulator 38 is derived from the output of flip-flop or one-half divider circuit 30. As explained hereinbelow, if a moving target is present at the chosen range, the output of second balanced modulator 38 will produce a sine wave at the Doppler frequency, and this Doppler frequency is amplified in audio channel 40 for detection by a radar operator.

In discussing the operation of the system, reference will be had to FIG. 2. FIG. 2A shows the clock pulses derived from clock pulse source 10 having a frequency $f_1$, the uniform time or spacing between clock pulses being $$t = \frac{1}{f_1}$$

The output of transmit code generator 12 is illustrated in FIG. 2B. It is to be noted that while the pulses of the transmit code are aperiodic and of random width, the duration of each transmitter code pulse is comprised of an integral number of clock pulses. Since, as hereinabove mentioned, the output phase of FM oscillator 16 is shifted 180° at the generation of each code pulse and also at the termination of each code pulse, the waveform of FIG. 2C then may represent a plot of the relative phase of the output of FM oscillator 16. In phase plot 2C, it is to be understood that if the upper of the two levels is indicated, the output of FM oscillator 16 has a given phase, and if the lower level is indicated, it means that the output phase has been either advanced or retarded by 180° from the phase corresponding to the upper level. For convenience, the RF phase shift may be said to vary from $-\pi/2$ to $+\pi/2$.

Assuming now that a fixed target existed at a range corresponding to four bits of delay, the output of the delayed code generator 28 will be that shown in FIG. 2D. Thus, the delay between the two code generators correspond to the delay time of a radar signal which goes from the transmitter to the target and returns to the radar antenna 18. With this assumption, the output of delayed code generator 28 is equivalent to the transmitter code signal of FIG. 2B but displaced four bits to the right FIG. 2E represents the phase changes of the received external echo or target signals in the same manner that FIG. 2C represents the phase of the transmitted signals. The target signals detected by antenna 18 are combined with the leak-through signal from FM oscillator 16 and applied to diode mixer 22. For purposes of analyzing the system, it is to be assumed that the target which has a four bit delay is positioned in such a manner that the magnitude of the sum of the two signals is represented by the waveform shown in FIG. 2F, that is, the reflected signal and the leak-through signal are in phase. Thus for the period from $t_1-t_2$, the leak-through signal shown in FIG. 2B and the echo of the signal represented in FIG. 2D are out of phase so they add up to minimum level; from $t_2$ to $t_5$ there is an in-phase relationship between the two so that they add up to a maximum level; from $t_5$ to $t_6$ the two signals add up to the minimum level again; from $t_6$ to $t_9$ the signals add up to the maximum level again; etc. The waveform shown in FIG. 2F is really the output AC component of the diode mixer 22. However, inasmuch as the leak-through signal was much larger in amplitude than the returning echoes, the magnitude of the sum of the two signals will always be much larger than zero so that the lower or minimum level indicated in curve 2F does not correspond to zero. Instead, this lower level might, for example, indicate a level only a fraction of a percent smaller than the average level. Since diode mixer 22 ignores phase, the magnitude of the output thereof shown in FIG. 2F presents a signal which is proportional to the magnitude of the sum of the two input RF signals. If the target echo had a slightly different spacing than the four bit delay, the phase of the returning signal might have been appreciably different and if the target were moving, the waveform shown in 2F would periodically be inverted. FIG. 2G illustrates the output of flip-flop circuit 30 which provides a repetitive series of pulses at one-half the clock frequency pulses or $f_1/2$. The output of flip-flop 30 is combined in first exclusive-OR circuit 32 with the output of transmitter code generator 12, FIG. 2B, and the resulting output is shown in FIG. 2H. The output of first exclusive-OR circuit 32, FIG. 2H, is combined with the output of delayed code generator 28, FIG. 2D, in second exclusive-OR circuit 34 to provide the waveform shown in FIG. 2J. When the amplified diode mixer output, FIG. 2F, is combined with FIG. 2J in first balanced modulator 26, the output will be that shown in FIG. 2K which is shown to be a clean rectangular type having a strong fundamental spectrum component at one-half clock frequency, $f_1/2$. The output of first balanced modulator 26 at this frequency is applied through IF amplifier 36, which is tuned to $f_1/2$, to second balanced modulator 38 where it is compared with the $f_1/2$ signal derived from flip-flop 30 indicated in FIG. 2G. If a moving target exists at a selected range, the waveform at the output of diode mixer 22 undergoes inversions each time the range of the target changes by ¼λ of the microwave transmitted signals. This in turn causes the rectangular waveform output from first balanced modulator 26 to undergo polarity inversions at a rate corresponding to the Doppler freqency shift. When combined with the waveform of FIG. 2G, this signal produces a sine wave at the Doppler frequency which is amplified in audio channel 40. The amplified audio signal may be applied to earphones or loudspeakers for detection by a radar operator. It can be seen that once the azimuth of a target has been determined by means of Doppler signals, the exact range of the target may be readily found by the system hereinabove described. It is obvious that targets from ranges not corresponding to the code displacement, that is not correlated, will not produce continuous signals in IF amplifier 36 but rather will produce low level noise.

Figure 3:
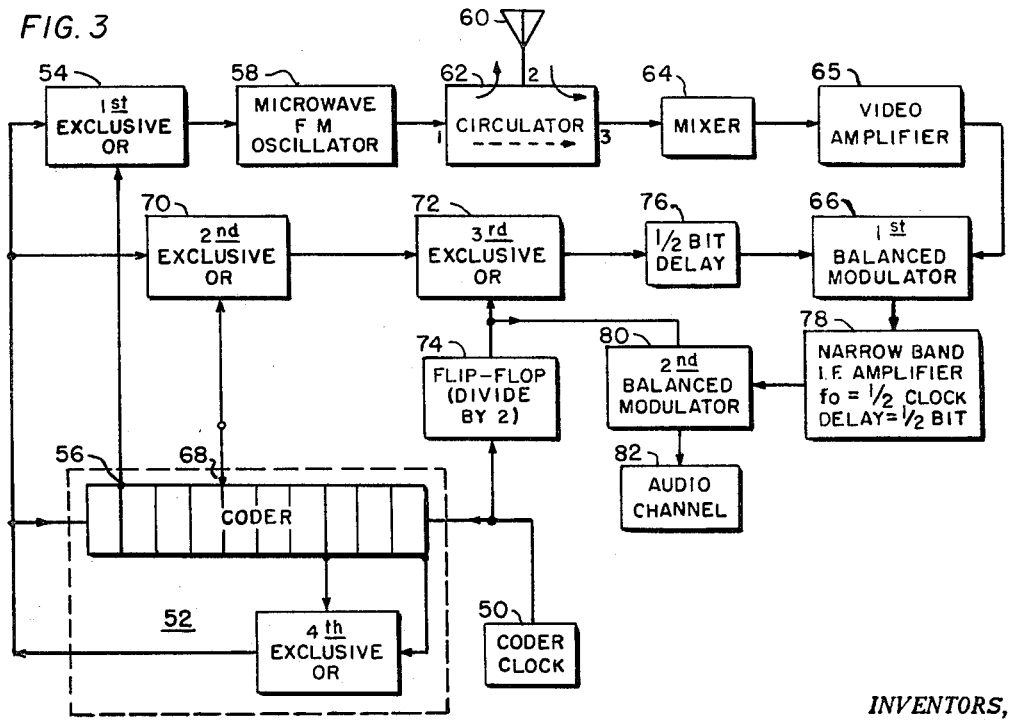
FIG. 3 is a schematic diagram of another embodiment of the present invention.

FIG. 3 illustrates a CW radar system wherein a pseudo-random code is employed. At 50 there is shown a clock pulse source adapted to provide a series of uniformly spaced clock pulses at a prescribed frequency $f_1$. A multi-path-feedback-shift-register coder 52 is responsive to the output of clock pulse source 50 to provide a pseudo-random code having a repetitive waveform which has a very desirable auto-correlation function. The code will be the length N equal to $2^n-1$, where $n$ is the number of stages in the register. This is the longest possible code from an $n$ stage register. As shown, the shift code register 52 may be provided with fixed or adjustable taps from which delayed pulses may be derived with respect to the output thereof. The code output of register coder 52 is combined in a first exclusive-OR circuit 54 with the same code displaced one bit to the right which is derived from tap 56 of shift register 52, and the resulting output from first exclusive-OR circuit 54 deviates the frequency of FM oscillator 58 which may comprise either a klystron or magnetron or any other FM oscillator well known in the art. The amplitude of the output of exclusive-OR circuit 54 is such that the frequency of microwave FM oscillator 58 is deviated sufficiently in magnitude to cause the output phase of the FM oscillator 58 signals to shift 180° during one clock pulse period. The output of FM oscillator 58 is applied to antenna 60 by means of conventional three port circulator 62 which is arranged such that RF energy entering port 1 from FM oscillator 62 is directed to antenna 60 through port 2 for transmission, and RF oscillator energy also leaks through circulator 62 to port 3 thereof without delay. Any targets in the path of the transmitted RF energy are returned to antenna 60 and are passed through to circulator port 3. By this arrangement, the leak-through signal is used as a local oscillator to combine with the delayed signals returning from external targets, the antenna 60 of course being utilized for both transmission and reception. The RF leak-through signal and the incoming or received target signals are combined at port 3 of circulator 62 and applied to a diode mixer 64 adapted to produce a video-form beat signal output. It is to be understood, of course, that the leak-through signal is of relatively large amplitude compared to the returning echoes.

The video output from diode mixer 64 is applied as one input through video amplifier 65 to a first balanced modulator 66. The outer input to first balanced modulator 66 is derived in the following manner. A delayed code is derived from adjustable tap 68 on shift register coder 52 such that the delayed code signal corresponds to the delay time of a radar signal which goes from the transmitter to the target and returns to the antenna 60. Of course, if desired, this signal could be derived from a separate coder. As shown, the delayed code signal is combined in a second exclusive-OR circuit 70 with the output of shift register coder 52, and the resultant output from second exclusive-OR circuit 70 is combined with one-half the clock pulse frequency from clock source 50 in a third exclusive-OR circuit 72. The one-half clock pulse frequency is derived from a divider or flip-flop circuit 74 in the conventional manner. The output of third exclusive-OR circuit 72 is applied as the other input to balanced modulator 66 through a delay circuit 76 which provides a delay of one-half bit. This half bit delay is necessary to provide better correlation between the target signal and its replica the delayed code signal, inasmuch as there is an inherent half bit delay in the output of the FM oscillator provided by the effective differentiation and integration process resulting from modulating the FM oscillator 58 by the output of exclusive-OR circuit 54. As shown, the output of first balanced modulator 66 is applied as one of two inputs to a second balanced modulator 80 through IF amplifier 78. The IF amplifier 78 is tuned to one-half the frequency of the clock pulses derived from source 50, and is also provided with a delay equal to one-half bit. The second or reference signal input to second or reference signal input to second balanced modulator 80 is derived from the output of flip-flop or one-half divider circuit 74. As explained hereinbelow, if a moving target is present, the output of second balanced modulator 80 will produce a sine wave at the Doppler frequency and the Doppler frequency is amplified in audio channel 82 for detection by a radar operator.

Figure 4:
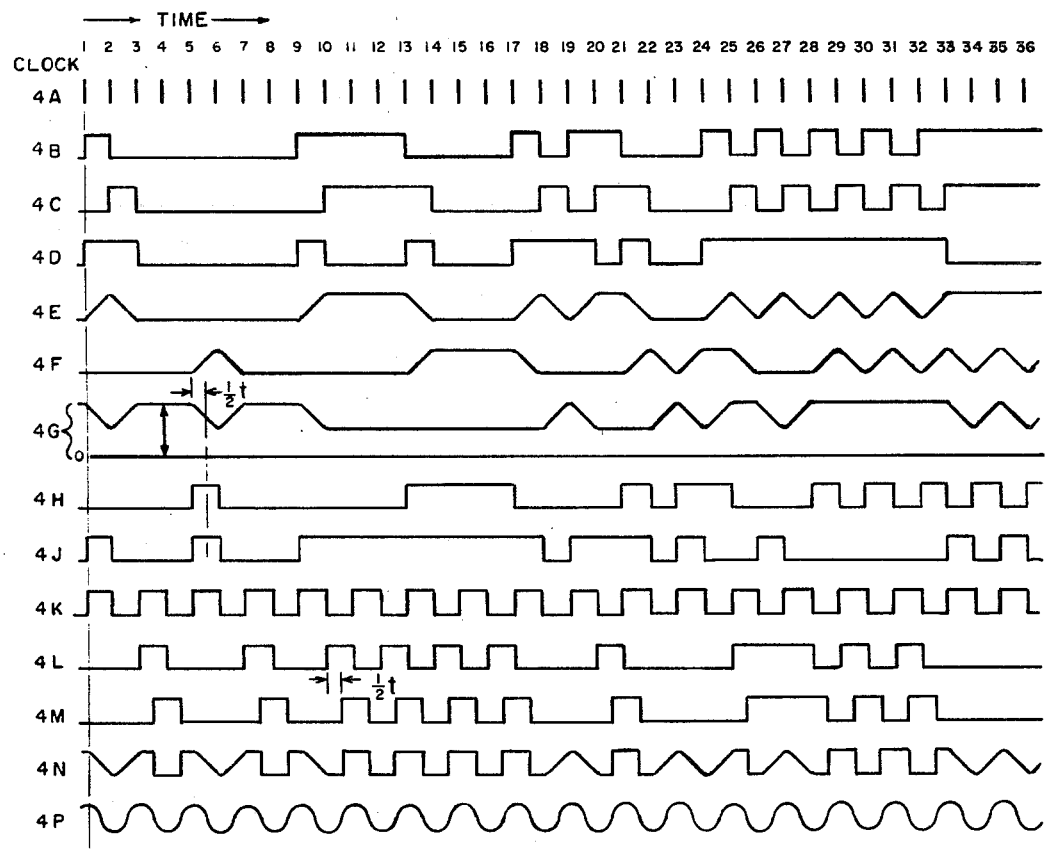

The wave shapes shown in FIG. 4 will be referred to in discussing the operation of the system shown in FIG. 3. FIG. 4A illustrates the clock pulses derived from source 50 having a frequency $f_1$ so that the uniform spacing between the clock pulses is $$t=\frac{1}{f_1}$$

The pseudo-random code is shown in FIG. 4B and the pseudo-random code delayed by one bit is shown in FIG. 4C. The curves of FIGS. 4B and 4C are combined in first exclusive-OR circuit 54 to produce the output illustrated in FIG. 4D. As mentioned hereinabove, the FM oscillator 58 is designed with a sensitivity such that phase gain in a one bit period will be 180°. Thus, with the modulating signal shown in FIG. 4D applied to FM oscillator 58, the phase shift of the FM oscillator 58 will be that shown in FIG. 4E. FIG. 4E thus represents the phase shift in the transmitted output frequency of FM oscillator 58 compared to the phase which would exist if no modulation were present. An examination of FIG. 4E shows it to be quite similar to the pseudo-random code signal shown in FIG. 4B.

Assuming now that a target existed at a range corresponding to four bits delay, the phase of the echo or target return will be that illustrated in FIG. 4F. As in the system shown in FIG. 1, the combination of the two RF signals in mixer 64 will produce an output as illustrated in FIG. 4G. With the assumption hereinabove made, the delayed code signal corresponding to the target range will be that shown in FIG. 4H and this output is combined with the register coder 52 output, FIG. 4B, in second exclusive-OR circuit 70 to produce the output waveform shown in FIG. 4J. The output shown in FIG. 4J is then combined with the output of flip-bop or one-half divider circuit 74, shown in FIG. 4K, in exclusive-OR circuit 72 to produce the output shown in FIG. 4L. The output of third exclusive-OR circuit 72 is then shifted by one-half bit to provide the output shown in curve 4M. This delay is required to obtain maximum correlation since it can be seen that the waveform in FIG. 4G is delayed with respect to FIG. 4J by one-half clock pulse. The AC output of mixer 64 illustrated in FIG. 4G is combined with the code-like signal shown in FIG. 4M in first balanced modulator 66 to produce the output shown in FIG. 4N. A study of the waveform in FIG. 4N indicates that a strong fundamental spectrum component is present whose frequency is $f_1/2$, or one-half the clock frequency. This fundamental frequency component is indicated in FIG. 4P and represents the output of narrow band IF amplifier 78. A combination of this IF frequency $f_1/2$ with the output $f_1/2$ from flip-flop or divider circuit 74 in second balanced modulator 80 will produce clean Doppler signals if the echo is from a moving target. It is obvious that targets from ranges not corresponding to the code displacement, that is not correlated, will not produce signals in IF amplifier 78, but rather will produce low level noise.

While the system shown in FIGS. 1 and 3 both utilize the one-half clock frequency signal as the IF signal for comparison with the output of the IF amplifier in the second balanced modulator, the IF circuitry and second balanced modulator may be eliminated in applications where weight is a prime factor and a slight loss in sensitivity can be tolerated. Such a system is shown in FIG. 5. As can be seen, only one balanced modulator is required and the one-half clock frequency and its concomitant circuitry is completely eliminated. That is, blocks 30, 32, 36 and 38 are eliminated from the system shown in FIG. 1. The operation of the system of FIG. 5 is similar to that described in connection with FIG. 1. The waveforms shown in FIGS. 2A, 2B, 2C, 2D, 2E, and 2F would be applicable to the system shown in FIG. 5.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A CW radar system comprising
   a microwave RF energy source,
   a source of clock pulses, means for deriving a random pulse code from said clock pulses,
   means responsive to said random pulse code signals for modulating the output frequency of said RF energy such that the phase of the output RF energy is at one phase level at the initiation of each of said code signals and at a second phase level shifted 180° with respect to said one phase level at the termination of each of said pulse code signals,
   common antenna means for radiating said alternately phase shifted RF energy and to receive a wave reflected from a distant target, said received wave being delayed a prescribed time corresponding to the range of the distant target,
   means for mixing said reflected wave with a portion of said radiated wave whereby a beat video-form signal is produced,
   means responsive to said clock pulse signals for producing a time-delayed replica of said RF modulating signal, said time delay corresponding to the range of the distant target,
   means for generating a signal at one-half the frequency of said clock pulses,
   a first comparison circuit having said beat video-form frequency applied thereto as one input,
   a second input signal applied to said first comparison means,
   said second input signal being derived from the combined outputs of said random code signals, said one-half clock frequency signal and said time-delayed replica signal to produce a code-like signal such that the output of said first comparison circuit comprises a signal having a strong component at said one-half clock frequency,
   means for amplifying said strong component signal at said one-half clock frequency,
   and a second comparison circuit responsive to said amplified signal and said one-half clock pulse frequency signal whereby there is produced an audio signal corresponding to the Doppler frequency of said target signal.

2. The system in accordance with claim 1 wherein said phase shift modulating means comprises a transmit code generator responsive to said clock pulses for producing a random pulse code in binary form and a differentiator responsive to said random pulse code and having its output applied to said microwave RF energy source.

3. The system in accordance with claim 1 wherein said first and second comparison circuits comprise balanced modulators.

4. A CW radar system comprising
   a microwave RF energy source,
   a source of clock pulses, means for deriving a random pulse code from said clock pulses,
   means responsive to said random pulse code signals for modulating the output frequency of said RF energy such that the phase of the output RF is at one phase level at the initiation of each of said code signals and at a second phase level shifted 180° with respect to said one phase level at the termination of each of said pulse code signals,
   common antenna means for radiating said alternately phase shifted RF energy and to receive a wave reflected from a distant target, said received wave being delayed a prescribed time corresponding to the range of the distant target,
   means for mixing said reflected wave with a portion of said radiated wave whereby a beat video-form signal is produced,
   means responsive to said clock pulse signals for producing a time-delayed replica of said RF modulating signal, said time delay corresponding to the range of the distant target,
   means for generating a signal at one-half the frequency of said clock pulses,
   a first exclusive-OR circuit responsive to said random pulse code signal and said one-half frequency signal,
   a second exclusive-OR circuit responsive to the output of said first exclusive-OR circuit and said time-delayed replica signal for producing a code-like video signal,
   means for comparing said beat video-form signal with said code-like video signal whereby there is produced a signal having a strong component at said one-half clock frequency,
   means for amplifying said strong component signal at said one-half clock frequency,
   and means for comparing said amplified signal and said one-half clock pulse frequency signal whereby there is produced an audio signal corresponding to the Doppler frequency of said target signal.

5. The system in accordance with claim 4 wherein said first and second comparison circuits comprise balanced modulators.

6. A CW radar system comprising
   a microwave RF energy source,
   a source of clock pulses, means for deriving a random pulse code from said clock pulses,
   means responsive to said random pulse code signals for modulating the output frequency of said RF energy such that the phase of the output RF energy is at one phase level at the initiation of each of said code signals and at a second phase level shifted 180° with respect to said one phase level at the termination of each of said pulse code signals,
   common antenna means for radiating said alternately phase shifted RF energy and to receive a wave reflected from a distant target, said received wave being delayed a prescribed time corresponding to the range of the distant target,
   means for mixing said reflected wave with a portion of said radiated wave whereby a beat video-form signal is produced,
   means responsive to said clock pulse signals for producing a time-delayed replica of said RF modulating signal, said time delay corresponding to the range of the distant target,
   means for generating a signal at one-half the frequency of said clock pulses,
   means for producing a first pulse signal only when one of said random pulses is present or said one-half clock pulse source is present,
   means for producing a second pulse signal only when one of said first pulse signals or one of the pulses in said time-delayed replica signal is present,
   means for comparing said second pulse signals and said beat video-form signal whereby there is produced a signal having a strong component at said one-half clock frequency,
   means for amplifying said strong component signal at said one-half clock frequency,
   and means for comparing said amplified signal and said one-half clock pulse frequency signal whereby there is produced an audio signal corresponding to the Doppler frequency.

7. A CW radar system comprising
a microwave RF energy source,
a source of clock pulses,
means responsive to said clock pulses for producing both a pseudo-random code signal and said pseudo-random code signal shifted one bit,
means responsive to said pseudo-random code signal and said one bit shifted pseudo-random code signal for frequency modulating said RF energy such that the output phase of said microwave RF energy will be shifted 180° in any one bit period,
common antenna means for radiating said phase shifted RF energy and to receive a wave reflected from a distant target, said received wave being delayed a prescribed time corresponding to the range of the distant target,
means for mixing said reflected wave with a portion of said radiated wave whereby a beat video-form signal is produced,
means responsive to said clock pulses for producing a time-delayed replica of said pseudo-random code signal, said time delay corresponding to the range of the distant target,
means for generating a signal at one-half the frequency of said clock pulse,
means for producing a first pulse signal only when pulses of said pseudo-random code are present or when pulses in the time delayed replica signal are present,
means for producing a second pulse signal only when said first pulse signal or said one-half clock frequency pulses are present,
means for delaying said second pulse signal one-half bit,
means for comparing said one-half bit delayed second pulse signal and said beat video-form signal whereby there is produced a signal having a strong component at said one-half clock frequency,
means for amplifying said strong frequency component at said one-half clock frequency delayed one-half bit,
and means for comparing said amplified signal and said one-half clock frequency signal whereby there is produced an audio signal corresponding to the Doppler frequency of said target signal.

8. The system in accordance with claim 7 wherein each of said comparing means comprises a balanced modulator.

9. A CW radar system comprising
a microwave RF energy source,
a source of clock pulses,
means responsive to said clock pulses for producing both a pseudo-random code signal and said pseudo-random code signal shifted one bit,
means responsive to said pseudo-random code signal and said one bit shifted pseudo-random code signal for frequency modulating said RF energy such that the output phase of said microwave RF energy will be shifted 180° in any one bit period,
common antenna means for radiating said phase shifted RF energy and to receive a wave reflected from a distant target, said received wave being delayed a prescribed time corresponding to the range of the distant target,
means for mixing said reflected wave with a portion of said radiated wave whereby a beat video-form signal is produced,
means responsive to said clock pulses for producing a time-delayed replica of said pseudo-random code signal, said time delay corresponding to the range of the distant target,
means for generating a signal at one-half the frequency of said clock pulse,
a first comparison circuit having said beat video-form signal applied thereto as one input,
a second input signal applied to said first comparison means,
said second input signal being derived from the combined outputs of said pseudo-random code signal, said one-half clock frequency signal and said time-delayed replica pseudo-random signal, to produce a code-like signal, and a means for delaying said code-like signal one-half bit, such that when said one-half bit delayed code-like signal is compared with said beat video-form signal there is produced in the output of said first comparison circuit a signal having a strong component at said one-half clock frequency,
means for amplifying said strong frequency component at said one-half clock frequency,
and a second comparison circuit responsive to said amplified signal and said one-half clock pulse frequency signal whereby there is produced an audio signal corresponding to the Doppler frequency of said target signal.

10. A CW radar system comprising
a microwave RF energy source,
a source of clock pulses, means for deriving a random pulse code from said clock pulses,
means responsive to said random pulse code signals for modulating the frequency of said RF energy such that the phase of the output RF energy it at one phase level at the initiation of each of said code signals and at a second phase level shifted 180° with respect to said one phase level at the termination of each pulse code signal,
common antenna means for radiating said alternately phase shifted RF energy and to receive a wave reflected from a distant target, said received wave being delayed a prescribed time corresponding to the range of the distant target,
means for mixing said reflected wave with a portion of said radiated wave whereby a beat video-form signal is produced,
means responsive to said clock pulse signals for producing a time-delayed replica of said RF modulating signal, said time delay corresponding to the range of the distant target,
an exclusive-OR circuit responsive to said random pulse code and said time-delayed replica signal for producing a code-like signal,
and means for comparing said beat video-form signal and said code-like signal whereby there is produced an audio signal corresponding to the Doppler frequency of said target signal.

No references cited.

RODNEY D. BENNETT, *Primary Examiner.*

J. P. MORRIS, *Assistant Examiner.*